(12) United States Patent
Feke

(10) Patent No.: US 11,047,687 B2
(45) Date of Patent: Jun. 29, 2021

(54) FIBER MANAGEMENT ASSEMBLY FOR MULTI-AXIS FIBER OPTIC GYROSCOPE

(71) Applicant: The Charles Stark Draper Laboratory, Inc., Cambridge, MA (US)

(72) Inventor: Gilbert D. Feke, Windham, NH (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/476,719

(22) PCT Filed: Jan. 12, 2018

(86) PCT No.: PCT/US2018/013492
§ 371 (c)(1),
(2) Date: Jul. 9, 2019

(87) PCT Pub. No.: WO2018/132659
PCT Pub. Date: Jul. 19, 2018

(65) Prior Publication Data
US 2019/0353482 A1      Nov. 21, 2019

Related U.S. Application Data

(60) Provisional application No. 62/446,061, filed on Jan. 13, 2017.

(51) Int. Cl.
*G01C 19/72*    (2006.01)

(52) U.S. Cl.
CPC ......... *G01C 19/722* (2013.01); *G01C 19/728* (2013.01)

(58) Field of Classification Search
CPC ..... G01C 19/72; G01C 19/722; G01C 19/728
See application file for complete search history.

(56) References Cited

U.S. PATENT DOCUMENTS 4,315,693 A * 2/1982 Walker ................... G01C 21/16
356/470
4,815,853 A * 3/1989 Lefevre ................ G01C 19/728
356/462

(Continued)

FOREIGN PATENT DOCUMENTS

| FR | 2887339 A1 | 12/2006 |
| JP | 2010249557 A | 11/2010 |
| WO | 2018132659 A1 | 7/2018 |

OTHER PUBLICATIONS

English translation of FR 2887339; acquired from ESPACENET on Oct. 6, 2020. (Year: 2020).*

(Continued)

*Primary Examiner* — Michael A Lyons
(74) *Attorney, Agent, or Firm* — Hamilton, Brook, Smith & Reynolds, P.C.

(57) ABSTRACT

A fiber management assembly for a multi-axis fiber optic gyroscope (FOG) includes a mounting block. The mounting block includes an integrated optical circuit (IOC) mounting feature configured to permit mounting thereon an IOC. The mounting block further includes coil mounting features configured to permit mounting at least two optical fiber coils at the mounting block with the at least two fiber coils aligned in substantially different directions in three-dimensional space. The mounting block further includes an exterior surface having at least one substantially exterior, curved zone onto which connecting segments of respective optical fibers between the IOC and respective coils of the at least two optical fiber coils are routed and affixed.

21 Claims, 17 Drawing Sheets

(56) References Cited

U.S. PATENT DOCUMENTS

| | | | |
|---|---|---|---|
| 5,229,831 A | 7/1993 | Carroll et al. | |
| 5,357,339 A | 10/1994 | Teraoka et al. | |
| 5,854,678 A | 12/1998 | Liu | |
| 6,038,025 A | 3/2000 | Weed | |
| 6,209,383 B1* | 4/2001 | Mueller | G01C 19/72 73/1.37 |
| 8,823,946 B1 | 9/2014 | Logan, Jr. et al. | |
| 2016/0313125 A1* | 10/2016 | Taranta | G01C 19/722 |

OTHER PUBLICATIONS

Kissa et al., "Fiber-Optic Gyroscopes," Broadband Optical Modulators: Science, Technology, and Applications, pp. 505-515, 2012.
International Search Report and Written Opinion for PCT/US2018/013492, "Fiber Management Assembly For Multi-Fiber Optic Gyroscope," dated Mar. 20, 2018.

* cited by examiner

FIBER MANAGEMENT ASSEMBLY FOR MULTI-AXIS FIBER OPTIC GYROSCOPE

RELATED APPLICATION

This application is the U.S. National Stage of International Application No. PCT/US2018/013492, filed Jan. 12, 2018, which designates the U.S., published in English, and claims the benefit of U.S. Provisional Application No. 62/446,061, filed Jan. 13, 2017. The entire teachings of the above applications are incorporated herein by reference.

GOVERNMENT SUPPORT

This invention was made with Government support under Contract Number HQ0147-17-C-0046 awarded by the Missile Defense Agency. The Government has certain rights in this invention.

TECHNICAL FIELD

This disclosure relates generally to fiber optic gyroscopes (FOGs) and more particularly to a fiber management assembly for a multi-axis FOG.

BACKGROUND

Fiber optic gyroscopes (FOGs) are well known in the art and are used in a variety of applications. A FOG uses the interference of light to measure angular velocity. Rotation is sensed in a FOG with a large coil of optical fiber forming a Sagnac interferometer, as described, for example, in K. Kissa and J. E. Lewis, "Fiber-optic gyroscopes," Chapter 23 from "Broadband Optical Modulators," edited by Antao Chen and Ed Murphy, CRC Press, Boca Raton Fla., 2012, pp. 505-515, and in U.S. Patent Application 2009/0219545 to Feth.

In FIG. 1 there is schematically illustrated a prior art, single-axis FOG 100 that incorporates a Y-branch dual phase modulator (YBDPM) 4 formed on a chip known in the art as an integrated optical circuit (IOC) 7. An optical source 1, typically a laser, a light emitting diode (LED), a laser-pumped erbium-doped fiber amplifier, or other suitable light source, provides light that travels through a fiber optic coupler 2 and through YBDPM 4 to a fiber coil 6, entering the fiber coil 6 simultaneously through a pair of connecting segments 5 of optical fiber.

The FOG 100 senses rotation via the Sagnac effect, whereby rotation of the fiber coil 6 causes a non-reciprocal phase shift between the clockwise and counterclockwise propagating optical beams in the fiber coil 6. This non-reciprocal phase shift in the fiber coil 6, together with the phase modulation in the YBDPM 4, creates a change in light intensity at the photodiode 3 due to coherent interference of the two beams as they merge in the Y-junction of YBDPM 4 after transit in the fiber coil 6. The effect of phase modulation is non-reciprocal, as well, due to the transit time through the fiber coil. Hence, it can be used to interact with the non-reciprocal phase shift produced by rotation. The photodiode 3 produces an electrical signal proportional to the intensity of the received light, and variations in that signal provide an indication of the angular rotation speed of the fiber coil 6. The fiber-optic coupler 2 can be an evanescent directional coupler or an optical circulator.

FOG 100 shown in FIG. 1 is only capable of detecting angular velocity about a single axis. Therefore, at least three fiber coils are required to detect the attitude of an object which moves in three dimensions.

U.S. Pat. No. 5,357,339 to Teraoka et al. describes the mechanical configuration of a multi-axis FOG assembly including three independent FOG units, each FOG unit including optical and electronic components, such as an IOC, for allowing the unit to operate as a FOG to detect rotational angular velocity about one axis, each FOG unit having a shape obtained by dividing a polyhedron solid into three equal bodies which are symmetrical with respect to the axis of symmetry of the solid, and the three single-axis FOG units being united together in symmetrical positions with respect to the axis of symmetry to form a FOG which can detect rotational angular velocities about three orthogonal axes. However, having independent FOGs for each of the three axes involves an undesirable duplication of optical and electronic circuits such as the IOC.

U.S. Pat. No. 5,854,678 to Liu and Bergh describes a multi-axis FOG having three fiber coils for sensing rates of rotation in three axes orthogonal to one another and multiple YBDPMs formed on a single IOC. A schematic illustration of an IOC for a prior art multi-axis FOG 200 is shown in FIG. 2. Three YBDPMs 14a, 14b, 14c are formed on a single IOC 17. An optical source (not shown) provides light that travels through fiber optic couplers (not shown) and through each YBDPM 14a, 14b, and 14c, and each pair of connecting segments 15a, 15b, and 15c, respectively, to each fiber coil 16a, 16b, and 16c, respectively, each aligned in a substantially different direction in three-dimensional space.

SUMMARY

The known optical configurations for multi-axis fiber optic gyroscope (FOG) with a single integrated optical circuit (IOC) fall short of describing mechanical configurations for enabling the assembly of such a multi-axis FOG, in particular the routing and management of multiple connecting segments of optical fiber between points of attachment to the single IOC, where they may be aligned in a common direction, and each of the fiber coils, whose axes are, by necessity, aligned in substantially different directions in three-dimensional space. For example, U.S. Pat. No. 5,357,339, by using three separate units, fails to achieve the benefits of an integrated, multi-axis IOC and does not contemplate fiber routing issues between a multi-axis IOC and respective optical fiber coils in any way. U.S. Pat. No. 5,854,678 focuses on a three-axis IOC, only shows fiber routing schematically, and is silent on any practical three-dimensional fiber routing solutions between a multi-axis IOC and multiple coils. Accordingly, both U.S. Pat. Nos. 5,357,339 and 5,854,678 fail to solve or even contemplate the problems of fiber routing and management of multiple connecting segments of optical fiber between points of attachment to a multi-axis IOC and different fiber coils.

The present disclosure relates to a fiber management assembly for a multi-axis FOG. In particular, the limitations of the prior art can be overcome by routing and affixing connecting segments of optical fibers between a multi-axis IOC of a multi-axis FOG and respective fiber coils over curved surfaces of the unit, such as portions of a substantially spherical surface or smoothed (filleted) edges of a polyhedron, for example. In this manner, redundancy of components can be reduced, design and manufacturing can be simplified, connecting fibers between the modulators and respective optical fiber coils may be protected from damage, a FOG or inertial measurement unit (IMU) incorporating an embodiment assembly may be made more robust and ergonomic, and any risk of damage to the unit may be minimized. Other advantages may also be obtained, as will be illustrated in the drawings and described throughout this specification.

One aspect of the present disclosure provides a fiber management assembly including a housing configured to mount thereon an IOC and a mounting block for mounting at least two fiber coils aligned in substantially different directions in three-dimensional space. The mounting block may include mounting features for each of the at least two fiber coils and an exterior surface including curved zones onto which connecting segments of respective optical fibers between the IOC and the at least two fiber coils are routed and affixed.

In one example embodiment, a fiber management assembly for a multi-axis FOG includes a mounting block, and the mounting block, in turn, includes an IOC mounting feature configured to permit mounting thereon an IOC. The mounting block further includes coil mounting features configured to permit mounting at least two optical fiber coils at the mounting block with the at least two fiber coils aligned in substantially different directions in three-dimensional space. The mounting block further includes an exterior surface including at least one substantially exterior, curved zone onto which connecting segments of respective optical fibers between the IOC and respective coils of the at least two optical fiber coils are routed and affixed.

The exterior surface may have a substantially polyhedral shape. The exterior surface may further have a polyhedral shape that is a substantially rectangular block shape or a substantially cubical shape. The exterior surface may further have a substantially regular or irregular tetradecahedral shape or a substantially regular or irregular tetrahedral shape. The exterior surface may further have a substantially spherical shape. The substantially exterior, curved zone may include a filleted edge of the exterior surface or a groove or channel in the exterior surface. The substantially exterior, curved zone may include a smooth portion of the exterior surface, such as a portion of the exterior surface having a substantially spherical shape.

The IOC mounting feature may include a flat side or a curved portion of the exterior surface of the mounting block. The flat side or curved portion can be configured to receive the IOC or a housing of the IOC. The IOC mounting feature may be a screw, bracket, hardware, or adhesive location configured to receive the IOC or housing of the IOC. The coil mounting features may be further configured to permit mounting of the at least two optical fiber coils with respective input axes that share a common intersection point.

The coil mounting features may be further configured to permit mounting of the at least two optical fiber coils with respective input axes that are perpendicular to each other. The coil mounting features may be further configured to permit mounting of at least three optical fiber coils or at least four optical fiber coils, with the four optical fiber coils having four respective input axes that optionally intersect respective vertices of a tetrahedron.

The IOC may include Y-branch dual phase modulators or other phase modulators configured to modulate optical phase of light in the at least two optical fiber coils. The external surface may include means for securing the mounting block to a host surface. The mounting block may be monolithic or include a plurality of pieces that fit together to form the exterior surface.

An inertial measurement unit (IMU) may include a FOG with a fiber management assembly having any features described hereinabove, as well as at least one accelerometer.

The IMU may be configurable to output angular velocities for respective input axes of respective fiber coils based on information from the FOG and to output at least one acceleration based on information from the accelerometer.

In another example embodiment, a fiber management assembly for a multi-axis FOG includes an IOC mounting feature configured to permit mounting thereon an IOC; coil mounting features configured to permit mounting at least two optical fiber coils at the mounting block with the at least two fiber coils aligned in substantially different directions in three-dimensional space; and a substantially spherical exterior surface onto which connecting segments of respective optical fibers between the IOC and respective coils of the at least two optical fiber coils are routed and affixed.

Additional features and advantages will be set forth in the detailed description which follows, and in part will be readily apparent to those skilled in the art from the description or recognized by practicing the embodiments as described in the written description and claims herein, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments and, together, with the description, serve to explain principles and operation of the various embodiments.

Figure 1:
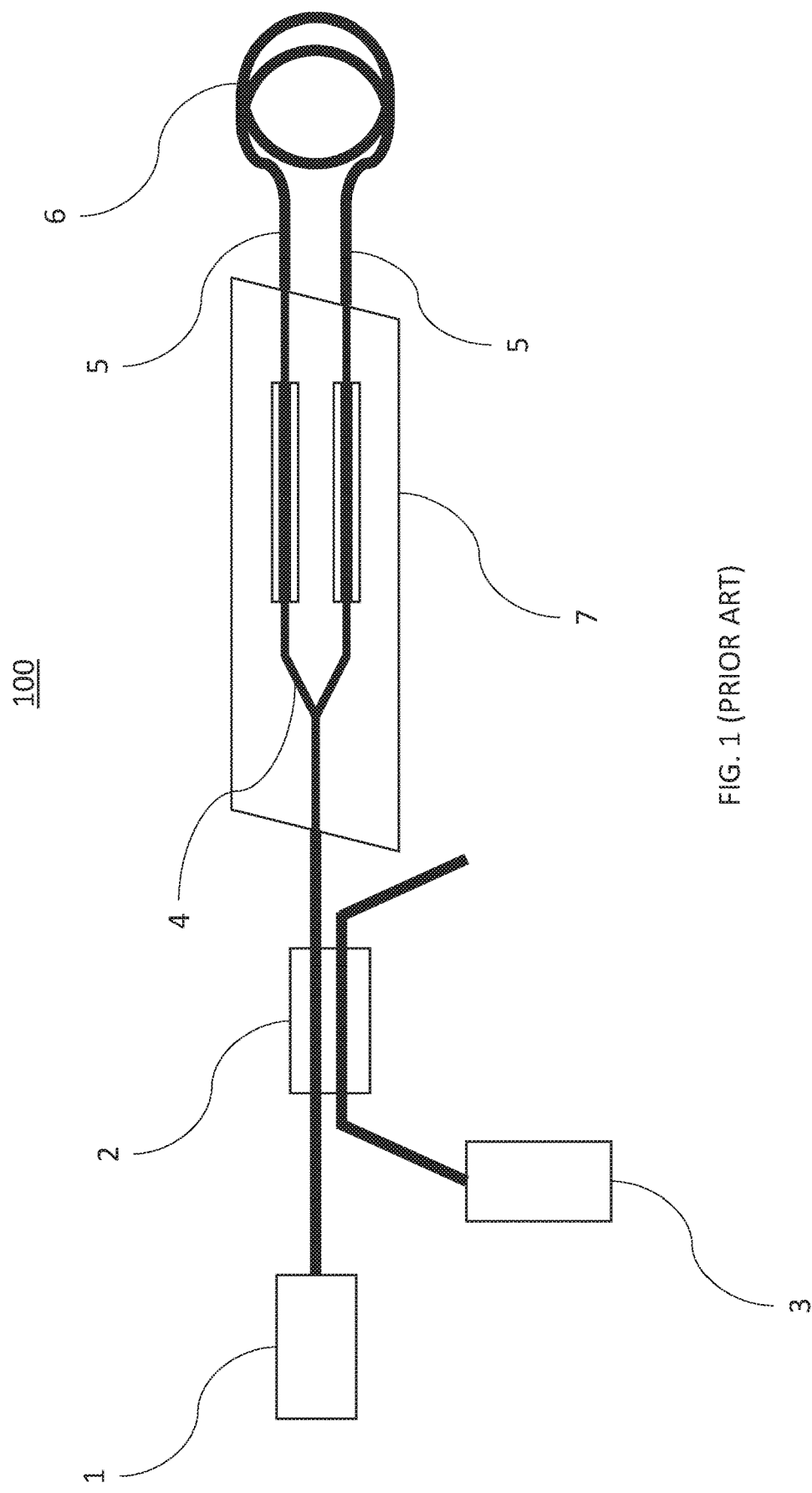
FIG. 1 is a schematic diagram of a prior art optical circuit for a single-axis fiber optic gyroscope (FOG)
Figure 2:
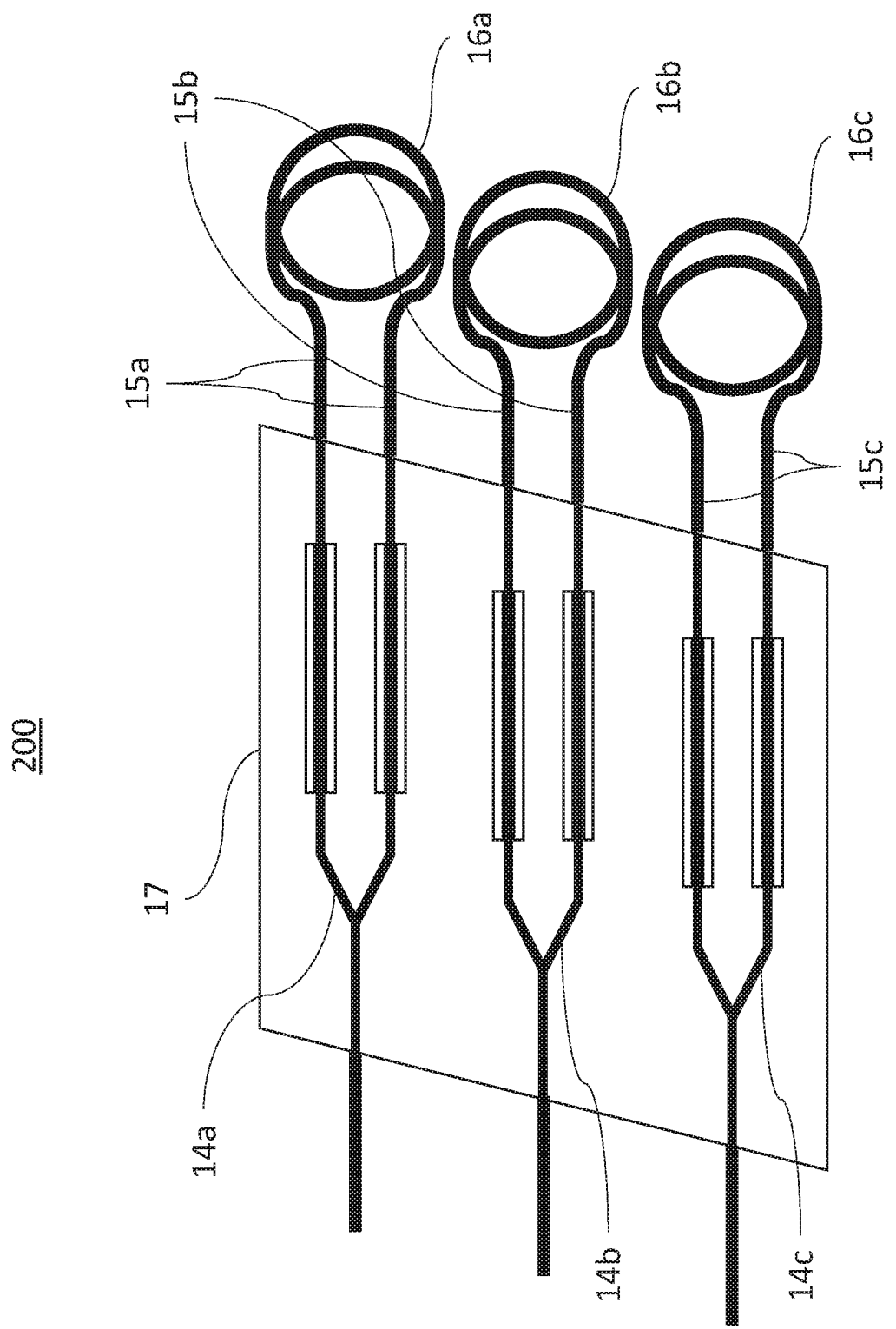
FIG. 2 is a schematic diagram of a prior art optical circuit for a multi-axis FOG.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments follows.

Figures shown and described herein are provided in order to illustrate key principles of operation and component relationships along their respective optical paths according to the present disclosure and are not drawn with intent to show actual size or scale. Some exaggeration may be necessary in order to emphasize basic structural relationships or principles of operations. Where they are used, the terms "first," "second," and so on, do not denote any ordinal or priority relation, but are simply used to more clearly distinguish one element from another.

The inventor has recognized a need for a fiber management assembly for a multi-axis fiber optic gyroscope (FOG).

Figure 3A:
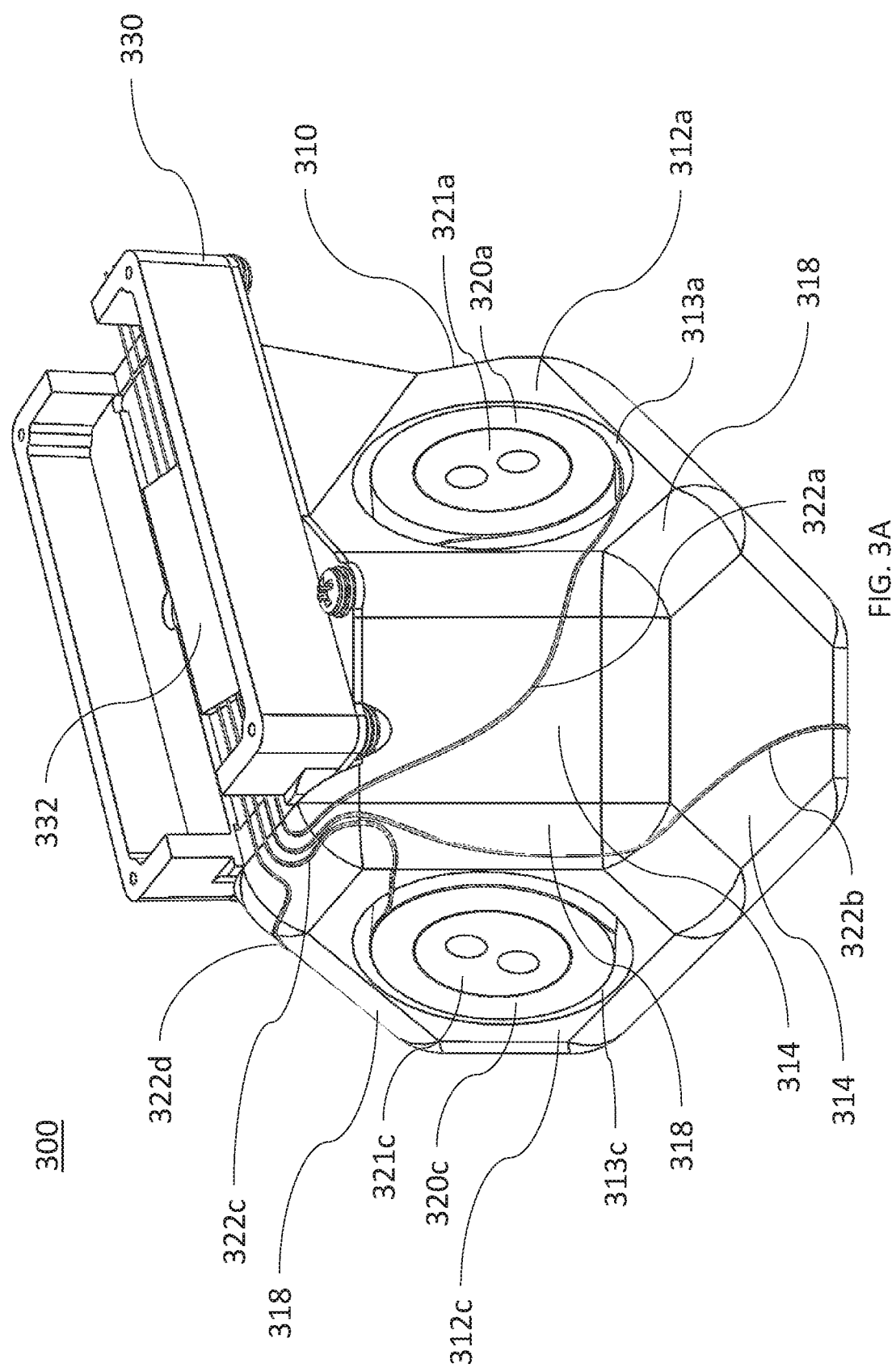
FIGS. 3A and 3B show different views of an example fiber management assembly for a multi-axis FOG including four axes according to an embodiment.
Figure 3B:
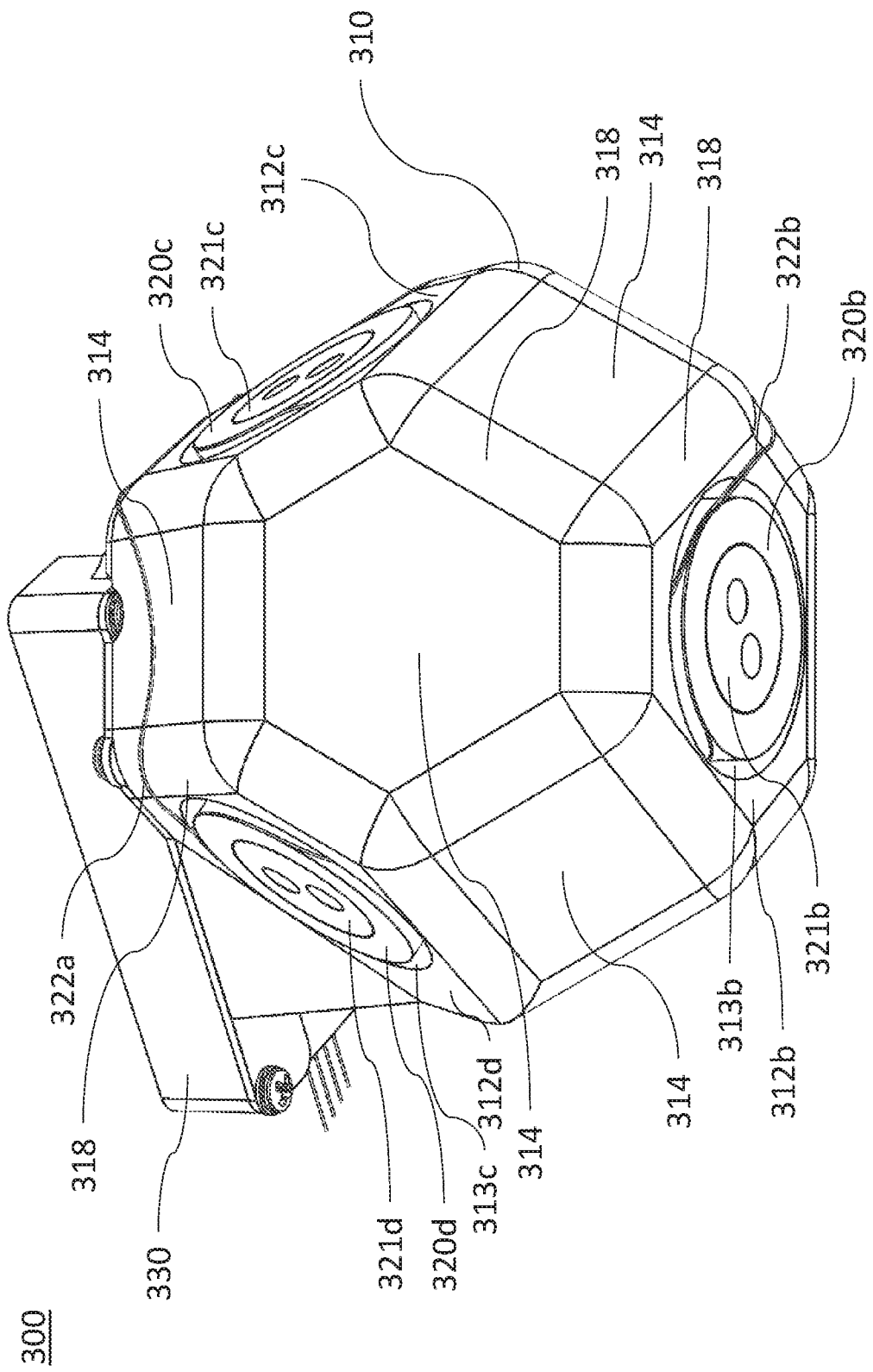
Figure 4:
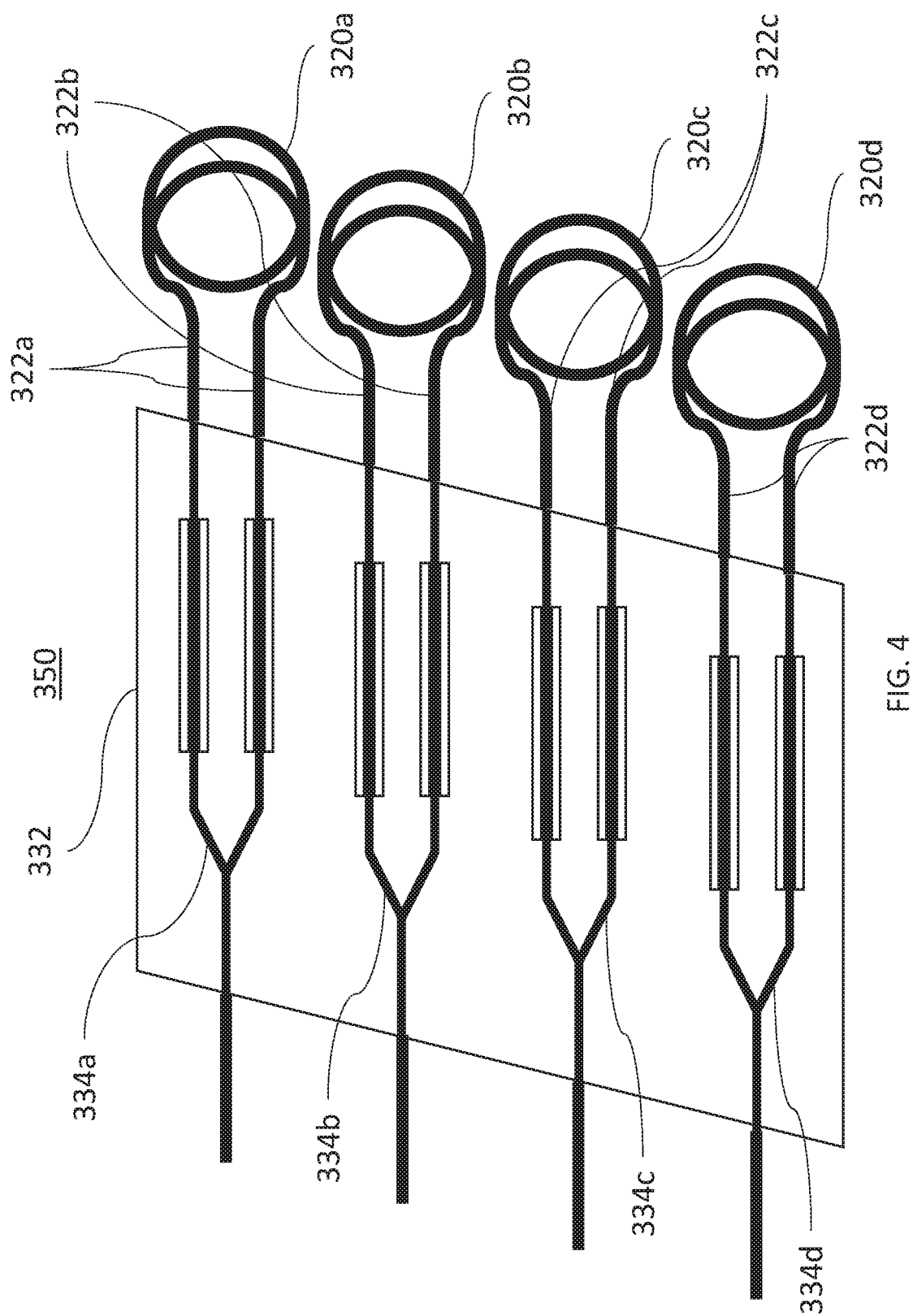
FIG. 4 shows a schematic diagram of an optical circuit for the multi-axis FOG of FIGS. 3A and 3B.

FIGS. 3A and 3B show different views of a fiber management assembly 300 for multi-axis FOG 350 including four axes, a schematic of whose optical circuit is shown in FIG. 4, according to an embodiment of the present disclosure. The optical circuit of the multi-axis FOG 350 includes: an IOC 332, on which four YBDPMs 334a, 334b, 334c, and 334d are formed; four respective optical fiber coils 320a, 320b, 320c, and 320d, each of whose optical fiber is pigtailed to one of the four YBDPMs, respectively; and other optical components, such as optical sources, fiber optic couplers, and photodiodes (not shown in FIG. 4) typically used for FOGs as known to those of ordinary skill in the art.

The example optical source 1, photodiode 3, and fiber-optic coupler 2 that are illustrated in FIG. 1, although not shown in FIG. 4, may be included in the optical circuit illustrated in FIG. 4. It will be understood that in some embodiments, an optical source may be shared for all four axes by means of an optical splitter, for example. In other embodiments, separate optical sources may be used to provide light to the respective YBDPMs 334a-d for the different axes illustrated in FIG. 4. Furthermore, as will be understood by those skilled in the art of FOGs, optical sources, such as coherent optical sources including lasers, fiber-optic couplers, and detectors such as photodiodes can form part of an optical engine of the FOG that is optically interconnected with the IOC 332.

The IOC 332 is packaged in an IOC housing 330. In FIGS. 3A-3B, the four optical fiber coils 320a, 320b, 320c, and 320d are each wound onto fiber coil hubs 321a, 321b, 321c, and 321d, respectively. The fiber coil hubs are coil mounting features that are configured to permit mounting of the coils 320a-d at the mounting block 310 with the fiber coils aligned in substantially different directions in three-dimensional space. Alternative coil mounting features can be included in other embodiments and can include screws, pins, hardware, brackets, or other hardware or features of the mounting block that can allow the optical fiber coils to be mounted at the block and aligned in substantially different directions. Coil mounting features may also include adhesives, for example, to allow the coils to be mounted to the exterior surface of the mounting block 310.

The embodiment of FIGS. 3A-3B also includes pockets 313a-d formed in the mounting block 310 to allow the optical fiber coils 320a-c to be mounted recessed into the surface of the mounting block 310. These pockets 313a-c are also coil mounting features, as used herein. However, in other embodiments, the optical fiber coils are mounted to be protruding from the exterior surface of the mounting block 310. Both recessed mounting and exterior mounting are within the scope of mounting optical fiber coils "at the mounting block," as used herein.

In the embodiment of FIGS. 3A-3B, the four fiber coils 320a-d are arranged in a regular tetrahedral pattern, such that their input axes substantially intersect at a common point or a common center of navigation. Tetrahedral arrangements, in certain embodiments such as the one reflected in the embodiment of FIGS. 3A-3B, can have particular advantages because the coil mounting features (e.g., the fiber coil hubs 321a-d) can be placed so as to permit mounting of the four optical fiber coils at the mounting block with the four coils aligned in substantially different directions in three-dimensional space. In particular, the coil mounting features may be configured to permit the mounting of the fiber coils with four respective input axes that intersect respective vertices of a virtual tetrahedron. As is understood, a tetrahedron (not illustrated in FIG. 3A or 3B) is a polyhedron with four triangular faces. A tetrahedron has four triangular faces, six straight edges, and four vertex corners (vertices). In the case of a regular tetrahedron, the four triangular faces are equal in size and shape, the six straight edges are equal in length, and the four vertices are angularly equidistant from each other.

Where input axes of the four respective fiber coils share a common intersection point and also intersect respective vertices of a regular tetrahedron, as in FIGS. 3A-3B, the orientations of the four fiber coils are angularly equidistant and optimized for measurement of three-dimensional motion. Furthermore, as will be understood by those skilled in the art, full, three-dimensional angular velocity may be obtained using a FOG and corresponding fiber management assembly having three optical fiber coils. However, full, three-dimensional angular velocity may also be obtained using more than three optical fiber coils, such as the four coils in FIGS. 3A-3B, with angular velocity about a given rotation axis being in general a superposition of measurements from two or more of the fiber coils.

As an alternative to all fiber coil input axes intersecting at a common point, each of the input axes of fiber coils 320a, 320b, 320c, and 320d may only be substantially parallel to one axis of a virtual set of axes that intersect at a common point. Input axes of fiber coils, as well as common points of intersection of input axes, are further illustrated and described in connection with FIG. 13.

The IOC housing 330 and fiber coil hubs 321a, 321b, 321c, and 321d are mounted onto the mounting block 310. The shape of the mounting block 310 is based on an irregular tetradecahedron including four faces 312a, 312b, 312c, and 312d, into each of which a pocket 313a, 313b, 313c, and 313d, respectively, is formed for encapsulating fiber coils

320a, 320b, 320c, and 320d, respectively; ten additional faces 314 (for a total of 14 faces); and curved zones formed by filleted edges 318.

The filleted edges 318 are a particularly advantageous feature of the embodiments of FIGS. 3A-3B for optical fiber management. The connecting segments of optical fiber 322a-d between the IOC 332 and respective fiber coils should be secured properly to the assembly and protected from damage or substantial movement for stable operation. However, where an IOC advantageously includes modulators or other optical components for multiple axes, routing between the IOC and the respective fiber coils can present issues. In particular, care must be taken to avoid bending the optical fibers such that breakage or optical loss occurs. The filleted edges 318 advantageously are provided in order to smooth the transition between the IOC and respective fiber coils, while also providing a secure mounting surface, for fiber connecting segments, including between different sides of the mounting block 310. The filleted edges 318 may be machined, molded, or formed using other methods known in the art of mechanical engineering.

Thus, the filleted edges 318 are a particularly effective and convenient example of curved zones on the exterior surface of the mounting block 310 that are used to route and affix connecting segments of respective optical fibers between the IOC and the respective optical fiber coils. In other embodiments, such as those illustrated and described in connection with FIGS. 11A-11B, the curved zones of the exterior surface of a mounting block are portions of a spherical or substantially spherical mounting block. In those cases, curved zones are easily provided, and filleted edges may be fewer or may be completely eliminated.

While the mounting block 310 has its exterior surface with an irregular tetradecahedral shape, in other embodiments, the exterior surface has a substantially cubic block shape, substantially rectangular block shape, substantially regular tetradecahedral shape, or another substantially polyhedral shape. Substantially cubic and substantially rectangular block shapes of exterior surfaces of embodiment mounting blocks provide simple, orthogonal faces on which three fiber coils may be mounted for full three-dimensional FOG function, for example. However, in the case of cubic and rectangular block shapes, a greater degree of filleting may be necessary than for the embodiment of FIGS. 3A-3B in order to minimize fiber bend radius over the otherwise relatively sharper edges.

Another example shape for an exterior surface of a mounting block can include a tetrahedral polyhedron, with four triangular faces, for example. In a tetrahedron arrangement, three sides of the tetrahedron may be used for mounting fiber coils, while the fourth side may be used for mounting an IOC. However, in another embodiment, each of the four sides of a tetrahedron has a fiber coil mounted thereon, and an IOC is mounted to a vertex or portion of one of the sides of the tetrahedron using an appropriately shaped IOC housing.

As used herein, an exterior surface that has a "substantially" polyhedral shape denotes that, notwithstanding various mounting features, pockets, filleted edges, etc., the polyhedral shape is still apparent. For example, in the embodiment of FIGS. 3A-3B, the irregular tetradecahedral shape of the exterior surface is clearly visible, notwithstanding the pockets 313a-d, fiber coils 320a-d, hubs 321a-d, and filleted edges 318, along with other hardware. Similarly, in other embodiments, a "substantially" spherical exterior surface shape for a mounting block indicates that, notwithstanding mounting features, flattened mounting sides, hardware, etc., a spherical surface is still visually discernible over much of the exterior surface of the housing of the mounting block.

Mounting block 310 may be monolithic, or alternatively may include a plurality of pieces that fit together to form the desired shape. In various embodiments, such as that illustrated in FIGS. 3A-3B, the substantially exterior, curved zones onto which connecting segments of respective optical fibers are affixed and routed are completely exterior to the mounting block. However, in some cases, grooves may be provided in the surface of the mounting block to route the connecting segments of the fibers therein. Furthermore, in other embodiments, the fibers may be covered with a channel, such that they are partially or fully embedded in or protected by the surface of the mounting block or covered by a protecting layer, such as an epoxy or a protective tape, for example. Accordingly, the curved zones for routing and affixing connecting segments of optical fibers need not be completely exposed at the exterior of the mounting block. Nonetheless, the curved zones are substantially exterior to the mounting block, resulting in smooth, secure, and advantageous routing between the IOC and respective fiber coils. With the curved zones substantially exterior to the surface of the mounting block, the length of the connecting segments and their exposure to potential damage tends to be minimized, and the physical routing transition between fiber coils, which are mounted in the vicinity of the surface, and the IOC, tends to be smoother.

Furthermore, in some embodiments, entire edges between different faces of a polyhedral mounting block are not filleted. Instead, substantially exterior, curved zones are provided by means of grooves or other features enabling smooth angular transitions between the different faces only at particular positions along the edge where the fibers are routed. In these embodiments, the edges of polyhedral mounting block may be thought of as filleted as illustrated in FIGS. 3A-3B only at particular locations of fiber routing. At other locations surrounding the fibers, the polyhedron edges may remain sharp.

Four pairs of connecting segments 322a, 322b, 322c, and 322d of optical fiber connect each of fiber coils 320a, 320b, 320c, and 320d, respectively, to each of the four YBDPMs 334a, 334b, 334c, and 334d, respectively, of IOC 332. Pairs of connecting segments 322a, 322b, 322c, and 322d are routed and fixed onto the faces 312a, 312b, 312c, and 312d, respectively, and the additional faces 314 and curved zones formed by filleted edges 318 as needed so as to stabilize and minimize bending of the optical fiber. The two fiber segments that form each pair of connecting segments 322a, 322b, 322c, and 322d may be affixed together, for example by an adhesive, prior to routing and affixing onto mounting block 310 to ensure matched experience of the local environment between them.

Figure 5:
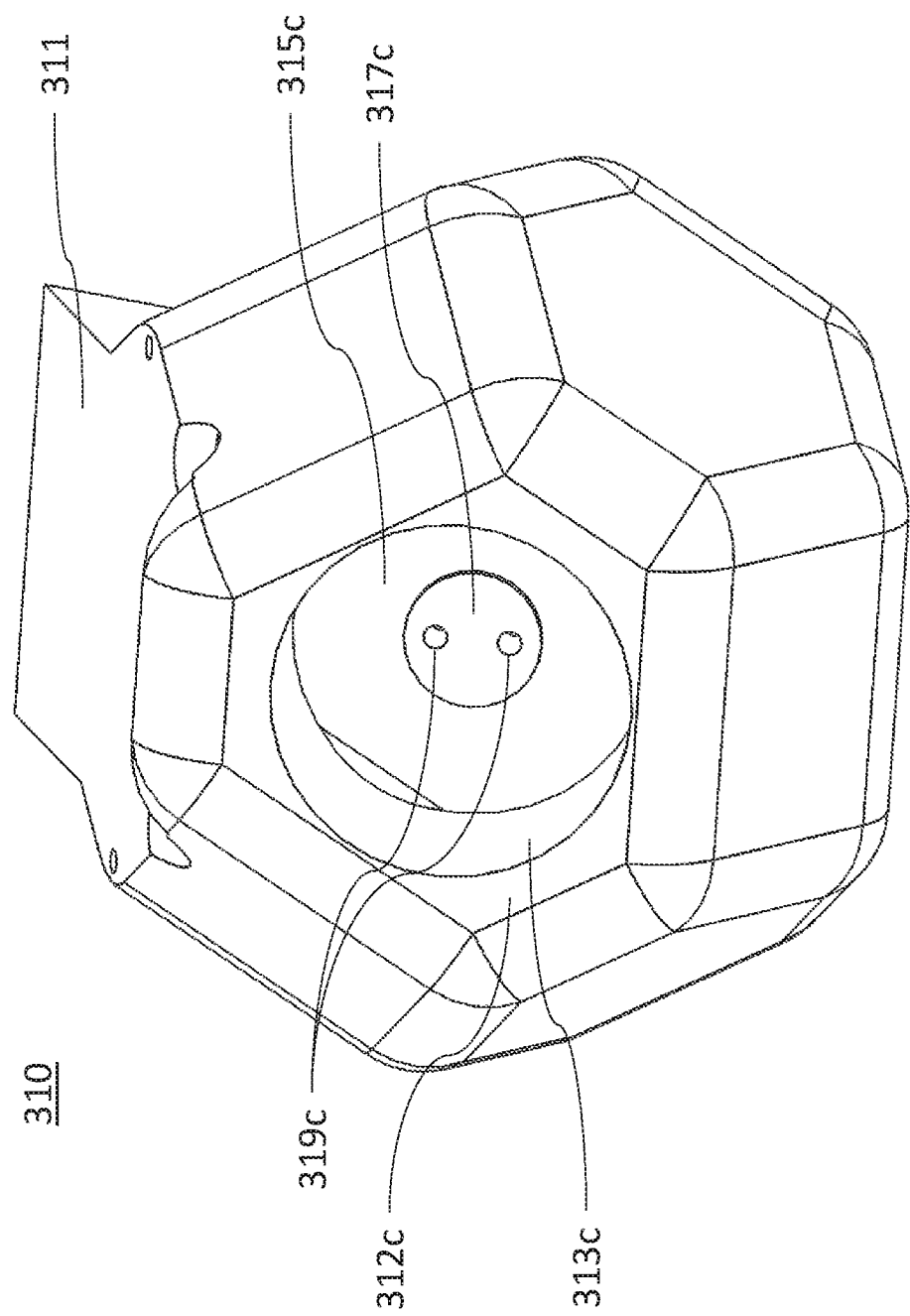
FIG. 5 shows a detail view of mounting features of a mounting block of the fiber management assembly shown in FIGS. 3A and 3B.

FIG. 5 shows the mounting features of mounting block 310 in detail. Pocket 313c is formed in face 312c for accepting fiber coil 320c. At the bottom of pocket 313c is a floor 315c from which raised mounting surface 317c protrudes for mounting hub 321c while providing a gap between fiber coil 320c and floor 315c of pocket 313c. Mounting surface 317c includes fastening features 319c for mounting hub 321c, such as threaded holes. As illustrated in FIG. 5, the coil mounting features include, in addition to the mounting hubs, the floors 315a-d, pockets 313a-d, and fastening features 319a-d. Corresponding features are present for faces 312a, 312b, and 312d for accepting fiber coils 320a, 320, and 320d, respectively. Mounting block 310 also includes IOC housing mounting features 311, such as a platform, for mounting housing 330 for IOC 332. Accordingly, in this and various other embodiments, the mounting features the IOC mounting features 311 (e.g., means such as a platform, curved surface, brackets, or other hardware) may permit attachment of the IOC to the mounting block by enabling mounting of a housing of the IOC.

Alternatively IOC 332, may be attached directly to mounting block 310, for example by an adhesive material. In direct attachment embodiments, the IOC mounting features may be considered to include an appropriate face of a polyhedral mounting block that allows use of adhesive for attachment, hardware, or positioning markers, for examples. In some embodiments, the housing 330 is configured to be attached to a mounting surface (not shown) where the FOG fiber management assembly is intended to be used. However, in other embodiments, the external surface of the mounting block 310 itself includes brackets, screw holes, or other features for securing the mounting block to a host surface where the FOG is intended to be used.

Figure 6:
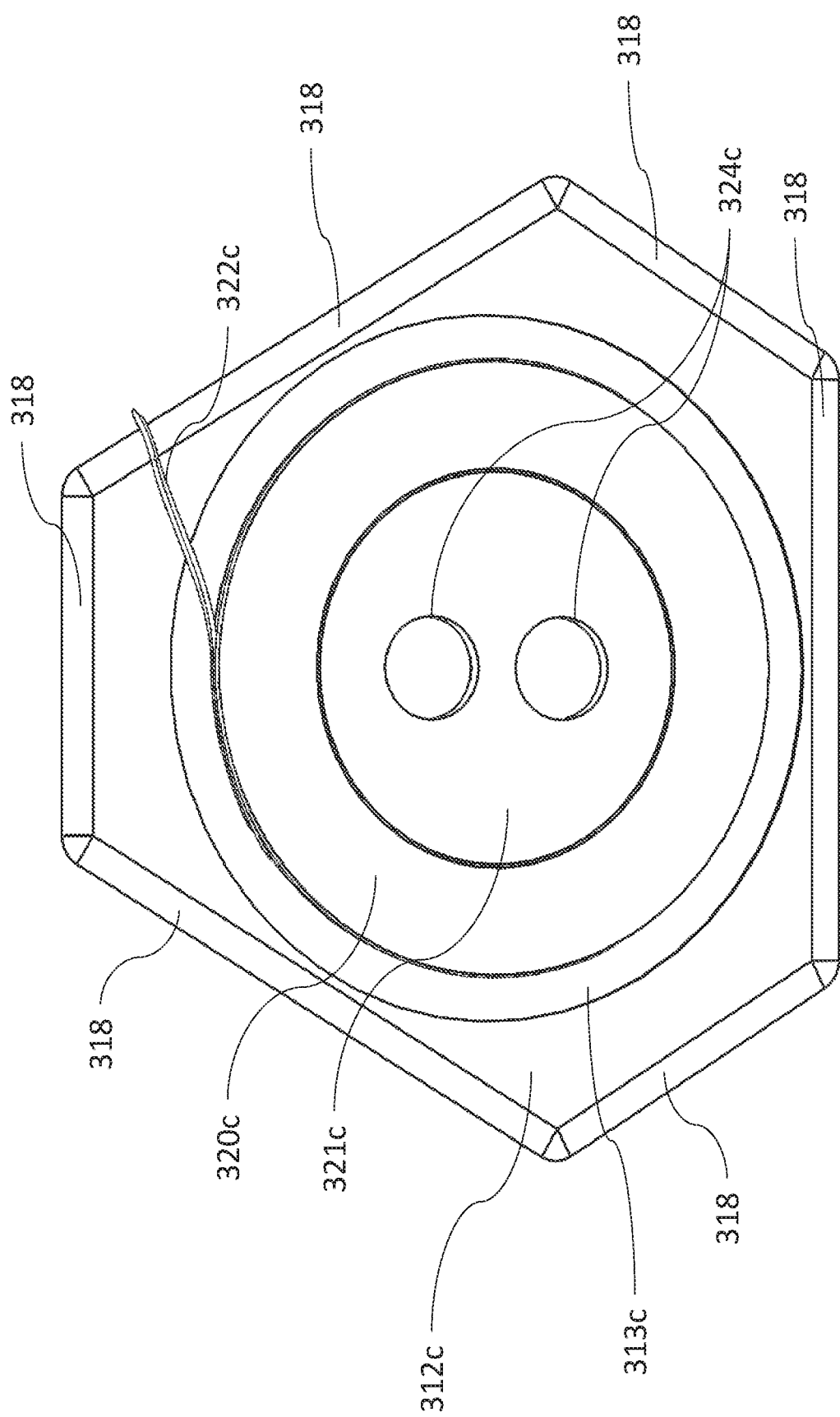
FIG. 6 shows a detail view of a pair of connecting segments of the optical fiber routed and fixed onto the mounting block from a fiber coil of the multi-axis FOG shown in FIGS. 3A and 3B.

FIG. 6 shows a detail view of the pair of connecting segments 322c of optical fiber routed and fixed onto the faces and filleted edges of mounting block 310 from fiber coil 320c as needed so as to stabilize and minimize bending of the optical fiber. Correspondingly the pairs of connecting segments 322a, 322b, and 322d of optical fiber are routed onto the faces and filleted edges of mounting block 310 from fiber coils 320a, 320b, and 320d. Also shown in FIG. 6 are fastening features 324c in hub 321c, such as clearance holes, for mounting hub 321c to mounting block 310.

Figure 7:
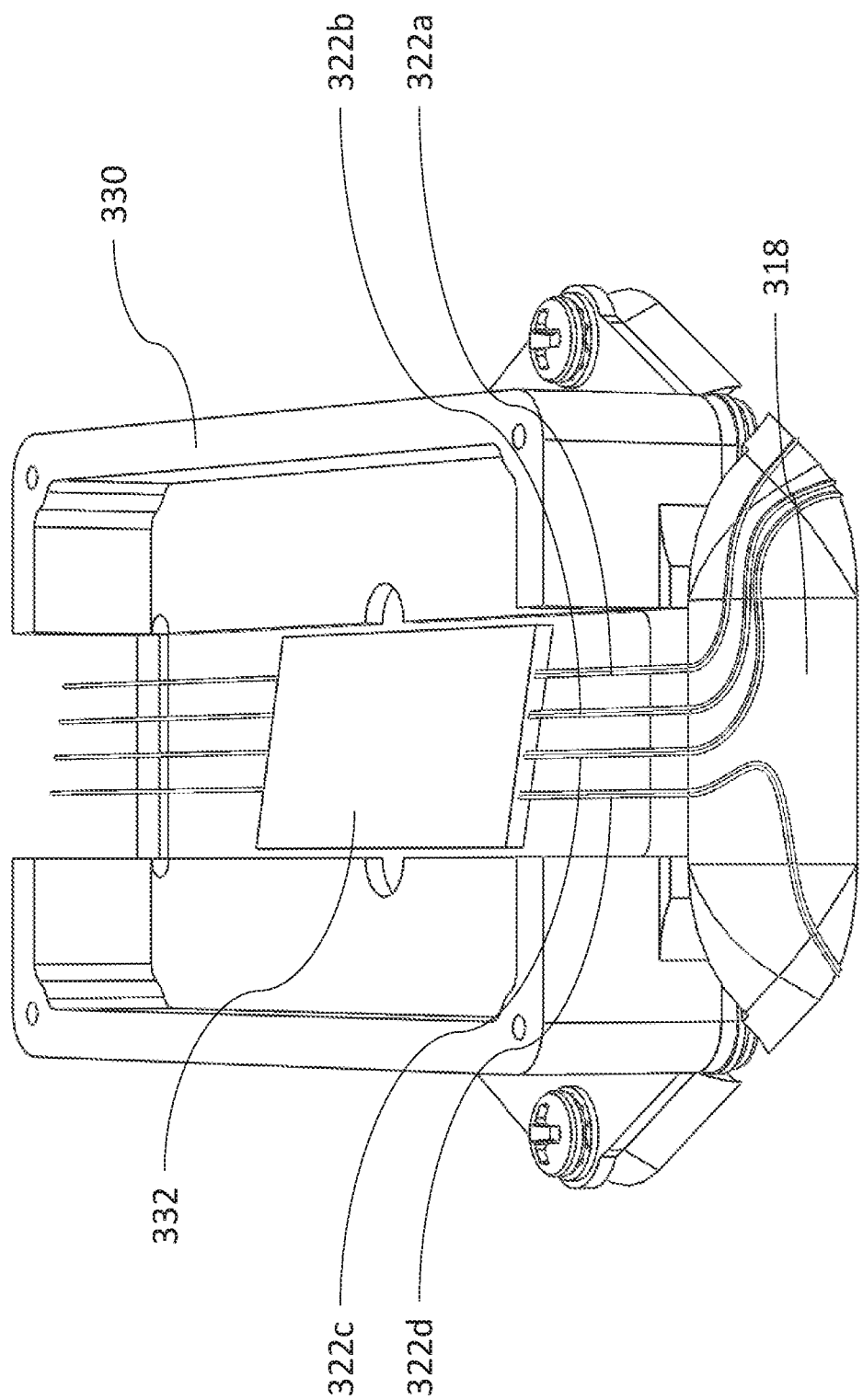
FIG. 7 shows a detail view of pairs of connecting segments of the optical fiber routed and fixed onto the mounting block from an integrated optical circuit (IOC) of the multi-axis FOG shown in FIGS. 3A and 3B.

FIG. 7 shows a detail view pairs of connecting segments 322a, 322b, 322c, and 322d of optical fiber routed and fixed onto the faces and filleted edges of mounting block 310 from IOC 332 as needed so as to stabilize and minimize bending of the optical fiber.

Figure 8A:
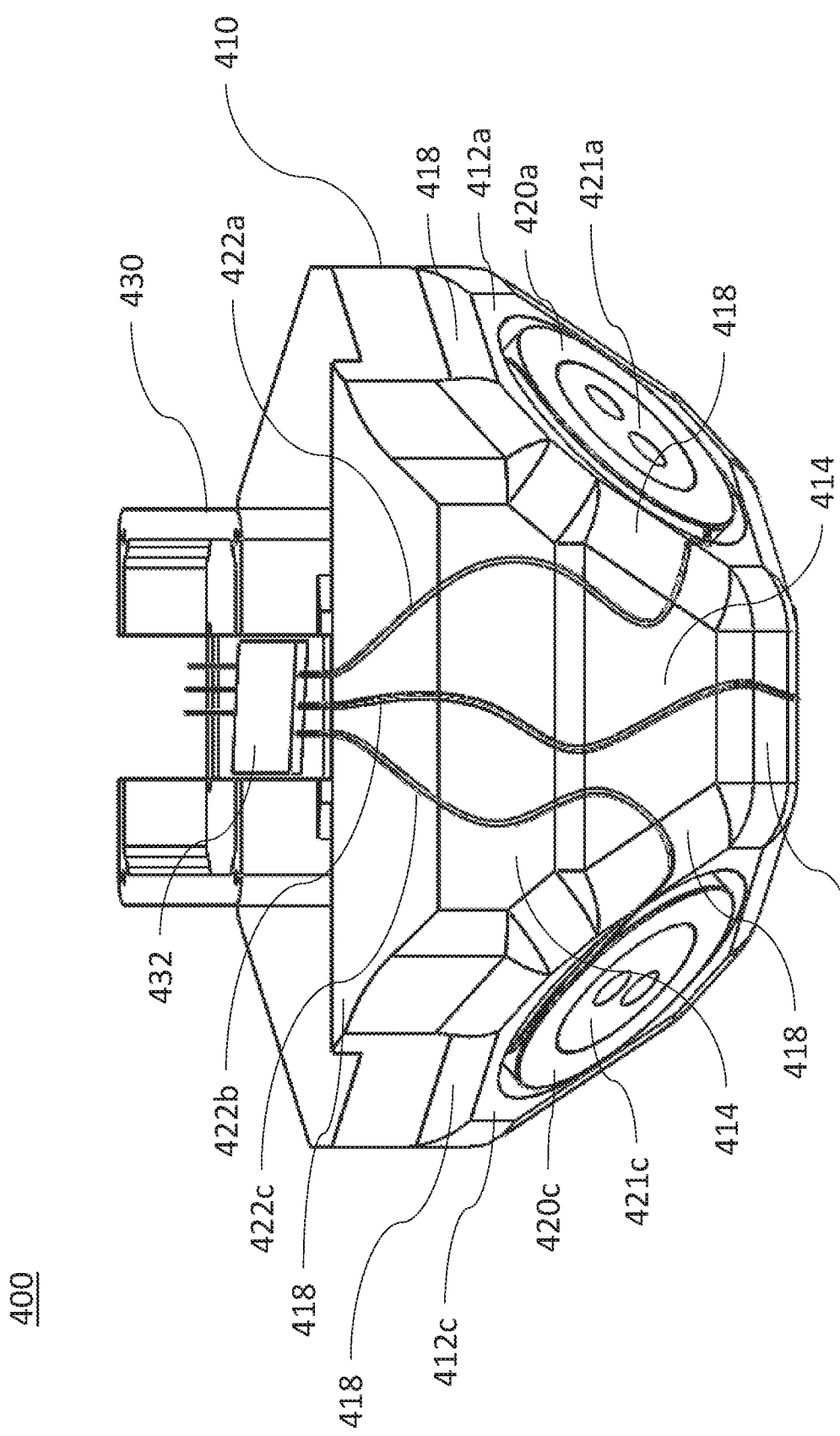
FIGS. 8A and 8B show different views of an example fiber management assembly for a multi-axis FOG including three axes according to an embodiment.
Figure 8B:
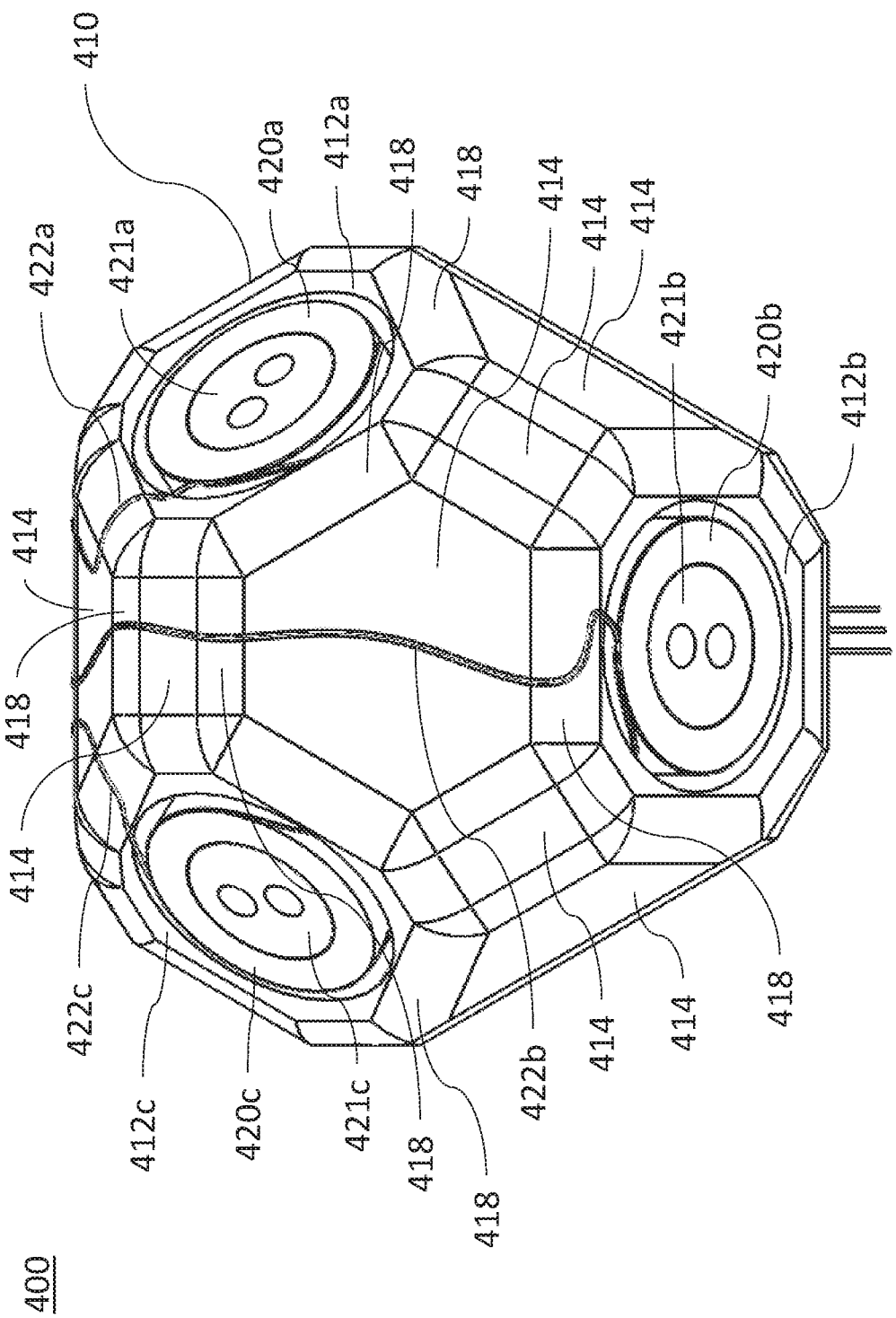
Figure 9:
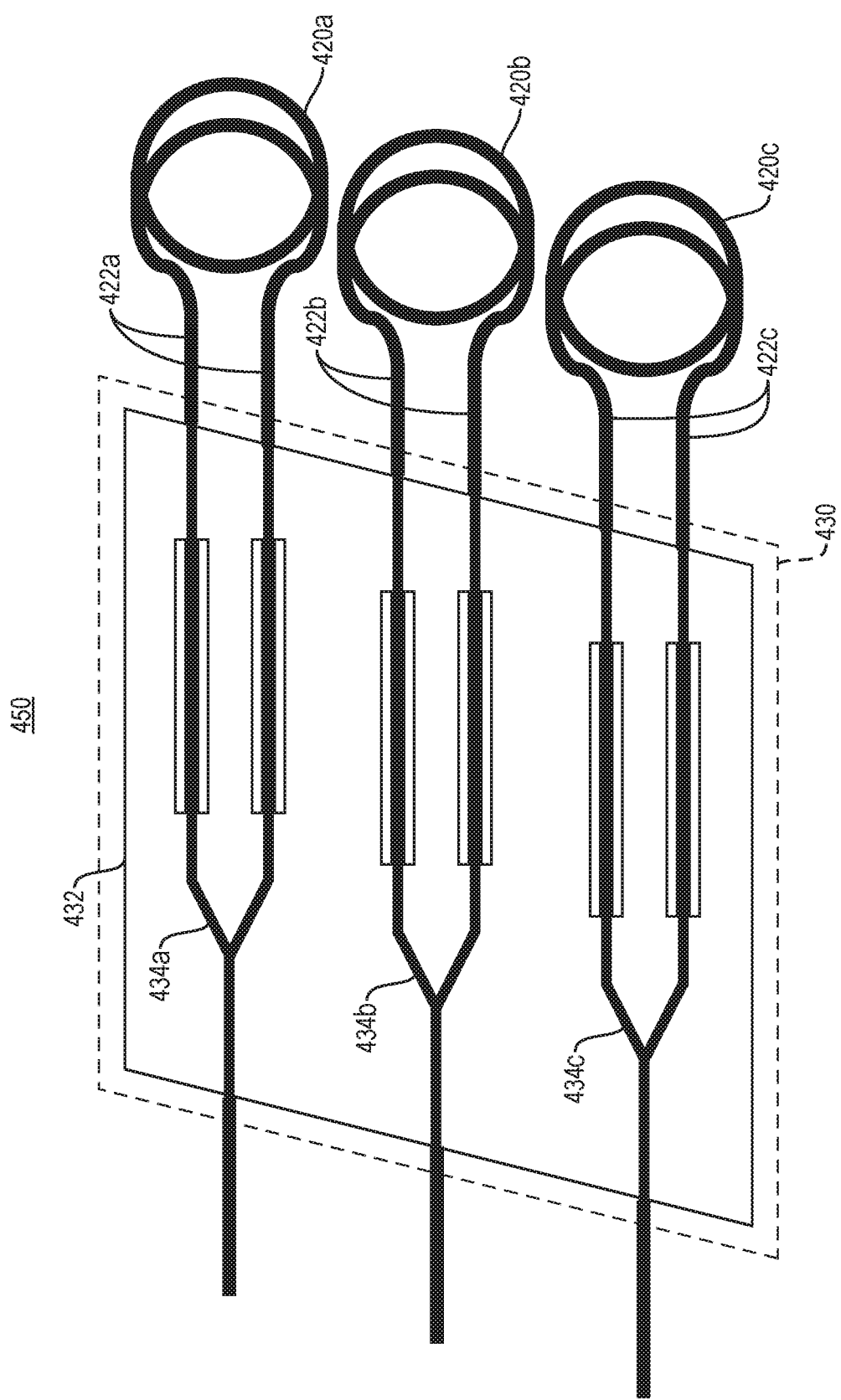
FIG. 9 shows a schematic diagram of an optical circuit for the multi-axis FOG of FIGS. 8A and 8B.

FIGS. 8A and 8B show different views of fiber management assembly 400 for multi-axis FOG 450 including three axes, a schematic of whose optical circuit is shown in FIG. 9, according to another embodiment of the present disclosure. The optical circuit of multi-axis FOG 450 is formed of: IOC 432, on which three YBDPMs 434a, 434b, and 434c are formed; three fiber coils 420a, 420b, and 420c, each of whose optical fiber is pigtailed to each of the three YBDPMs, respectively; and other optical components, such as optical sources, fiber optic couplers, and photodiodes (not shown) typically used for FOGs as known to those of ordinary skill in the art. IOC 432 is packaged in a housing 430. The three fiber coils 420a, 420b, and 420c are each wound onto hubs (hub coil mounting features) 421a, 421b, and 421c, respectively, and arranged in pattern along Cartesian axes such that their input axes substantially intersect at a common point or a common center of navigation.

Alternatively, each of the input axes of fiber coils 420a, 420b, and 420c may simply be substantially parallel to each of a virtual set of axes that intersect at a common point. Housing 430 and hubs 421a, 421b, and 421c are mounted onto a mounting block 410. Mounting block 410 includes three faces 412a, 412b, and 412c, into each of which a pocket 413a, 413b, and 413c, respectively, is formed for encapsulating fiber coils 420a, 420b, and 420c, respectively; additional faces 414; and curved zones formed by filleted edges 418.

Mounting block 410 may be monolithic, or alternatively may include a plurality of pieces that fit together to form the desired shape. Three pairs of connecting segments 422a, 422b, and 422c of optical fiber connect each of fiber coils 420a, 420b, and 420c, respectively, to each of the three YBDPMs 434a, 434b, and 434c, respectively, of IOC 432. Pairs of connecting segments 422a, 422b, and 422c are routed and fixed onto the faces 412a, 412b, and 412c, respectively, and the additional faces 414 and curved zones formed by filleted edges 418 as needed so as to stabilize and minimize bending of the optical fiber. The two fiber segments that form each pair of connecting segments 422a, 422b, 422c, and 422d may be affixed together, for example by an adhesive, prior to routing and affixing onto mounting block 410 to ensure matched experience of the local environment between them.

Figure 10A:
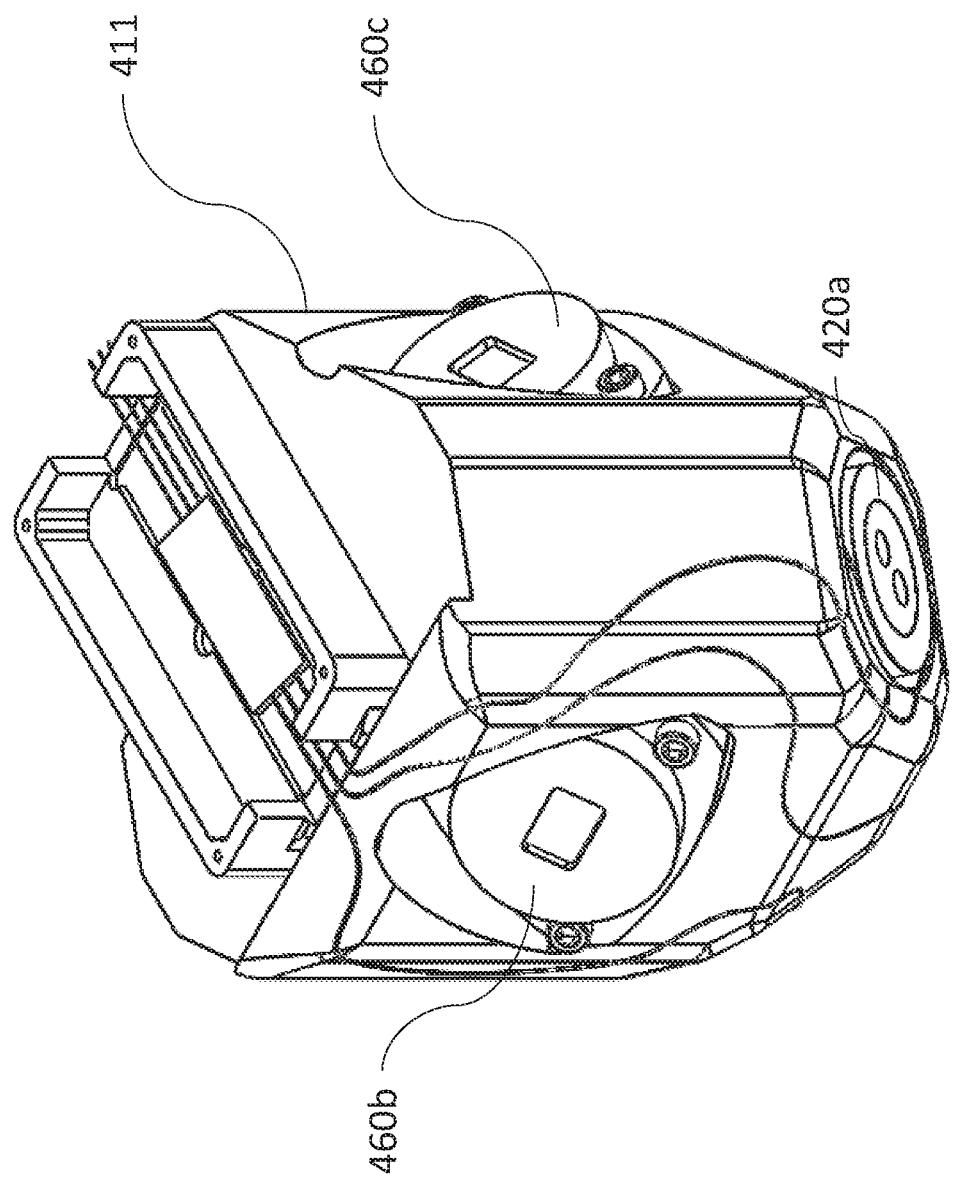
FIGS. 10A and 10B show different views of an elongated configuration of the fiber management assembly shown in FIGS. 8A and 8B for acceptance of multiple accelerometers to form an embodiment inertial measurement unit (IMU)
Figure 10B:
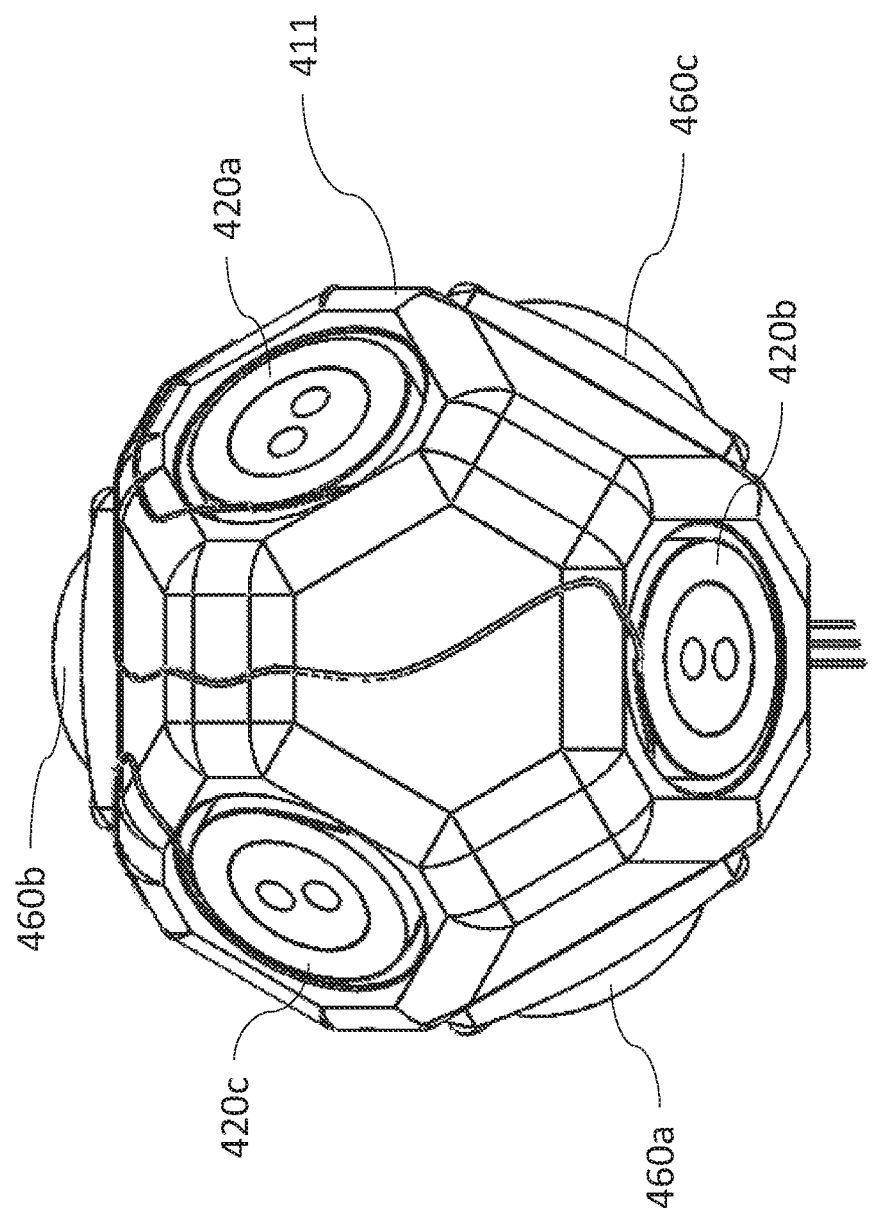

Embodiment fiber management assemblies are also advantageous for use in inertial measurement units (IMUs), in addition to FOGs. A FOG can output angular velocities for respective input axes of as many fiber coils as the FOG contains, as well as for various superpositions of such axes. An IMU additionally includes at least one accelerometer that provides acceleration for at least one direction based on its output information. FIGS. 10A-10B illustrate an embodiment fiber management assembly incorporated into an IMU.

FIGS. 10A and 10B show different views of an elongated configuration of the fiber management assembly 401 illustrated in FIGS. 8A and 8B, including mounting block 411 for acceptance of three accelerometers 460a, 460b, and 460c according to another embodiment of the present disclosure. Each of the input axes of accelerometers 460a, 460b, and 460c is substantially collinear with each of the input axes of fiber coils 420a, 420b, and 420c, respectively, such that all six input axes (three fiber coil input axes and three accelerometer input axes) intersect at a common point or a common center of navigation. Alternatively, one or more of the input axes of accelerometers 460a, 460b, and 460c may be askew with respect to the input axes of fiber coils 420a, 420b, and 420c.

Figure 11A:
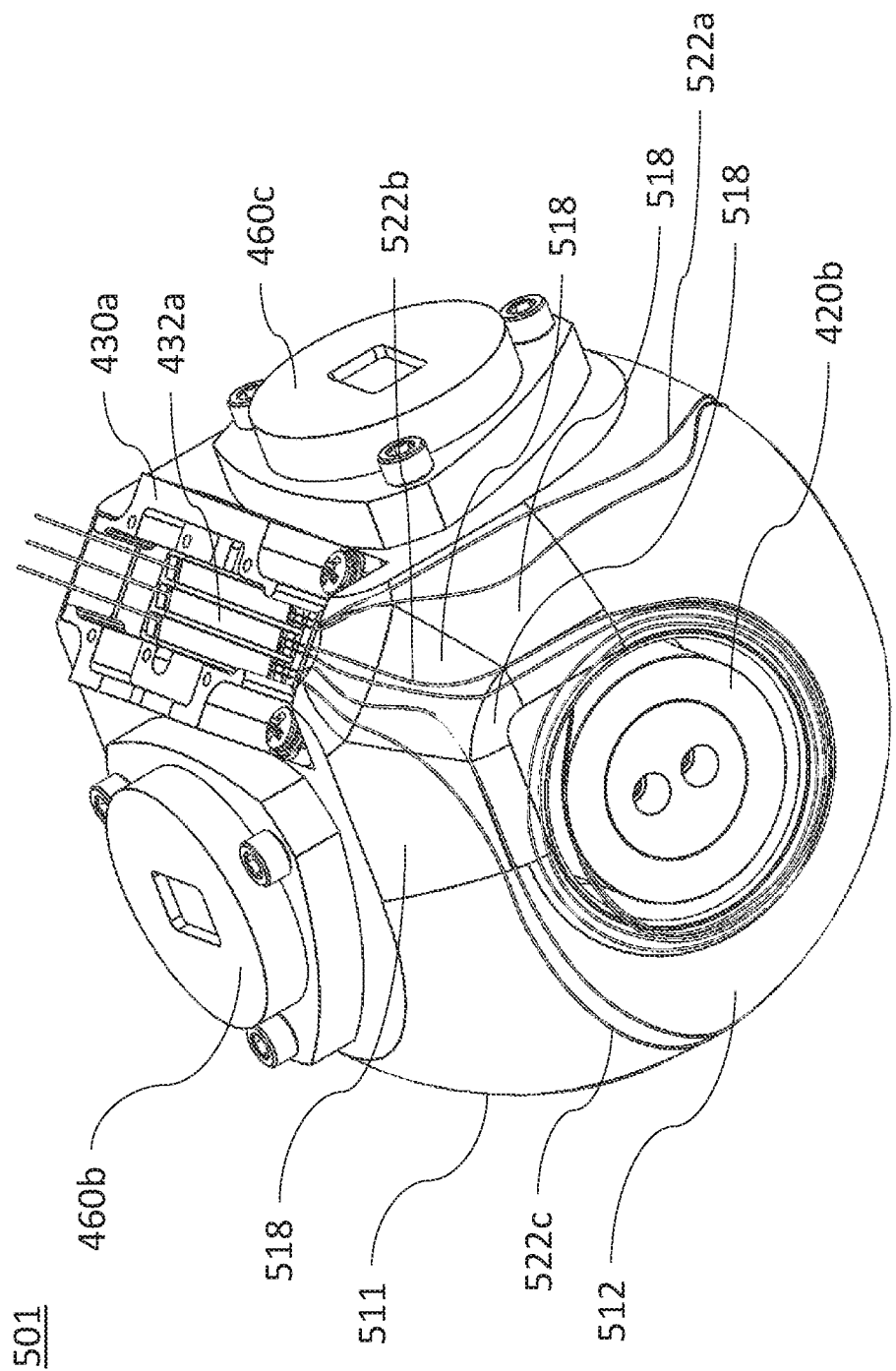
FIGS. 11A and 11B show different views of an example IMU including another example fiber management assembly for a multi-axis FOG including three axes according to another embodiment with a substantially spherical external surface.
Figure 11B:
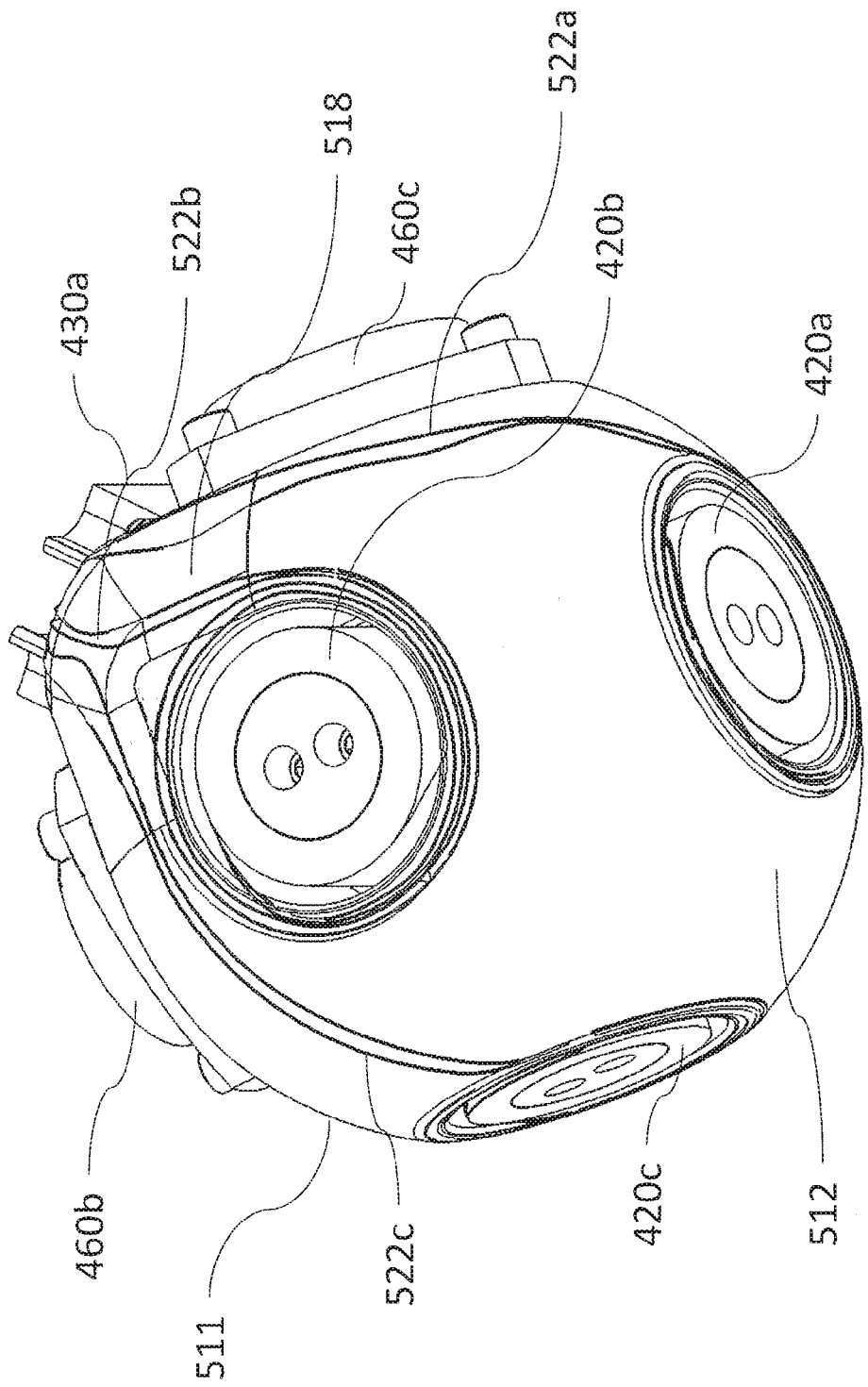

FIGS. 11A and 11B show different views of another example fiber management assembly 501, including mounting block 511 for multi-axis FOG 450a and for acceptance of three accelerometers 460a, 460b, and 460c according to another embodiment of the present disclosure. The IOC 432a is packaged in a housing 430a. The three fiber coils 420a, 420b, and 420c are arranged in a pattern along Cartesian axes such that their input axes substantially intersect at a common point or a common center of navigation. Alternatively, each of the input axes of fiber coils 420a, 420b, and 420c may simply be substantially parallel to each of a virtual set of axes that intersect at a common point.

Housing 430a and hubs 421a, 421b, and 421c are mounted onto mounting block 511. Mounting block 511 includes curved zones formed by filleted edges 518 and spherical surface zone 512 into which pockets 513a, 513b, and 513c are formed for encapsulating fiber coils 420a, 420b, and 420c, respectively. Mounting block 511 may be monolithic, or alternatively may include a plurality of pieces that fit together to form the desired shape.

In FIGS. 11A-11B, three pairs of connecting segments 522a, 522b, and 522c of optical fiber connect each of fiber coils 420a, 420b, and 420c, respectively, to each of the three YBDPMs 434a, 434b, and 434c, respectively, of IOC 432a. Pairs of connecting segments 522a, 522b, and 522c are routed and fixed onto filleted edges 518 and spherical surface zone 512. In this embodiment, the substantially exterior, curved zones onto which connecting segments of the optical fibers are routed and affixed include both the filleted edges 518 and portions of the spherical surface zone 512 of the substantially spherical exterior surface of the mounting block 511. The two fiber segments that form each pair of connecting segments 422a, 422b, 422c, and 422d may be affixed together, for example by an adhesive, prior to routing and affixing onto mounting block 511 to ensure matched experience of the local environment between them.

Each of the input axes of accelerometers 460a, 460b, and 460c is substantially collinear with each of the input axes of fiber coils 420a, 420b, and 420c, respectively, such that all six input axes (three fiber coil input axes and three accelerometer input axes) intersect at a common point or a common center of navigation. Alternatively, each of the input axes of accelerometers 460a, 460b, and 460c may be askew with respect to the input axes of fiber coils 420a, 420b, and 420c.

Figure 12:
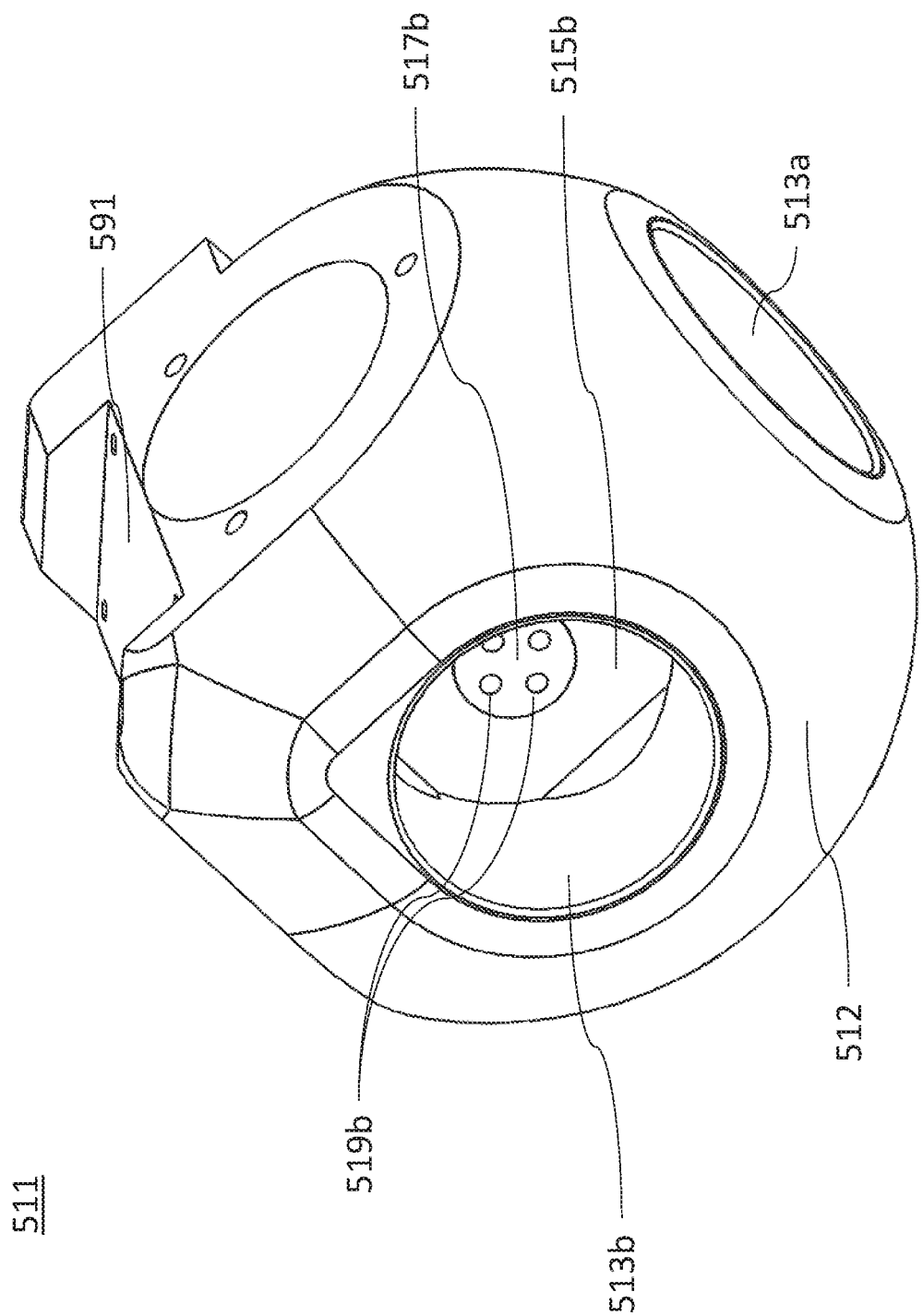
FIG. 12 shows a detail view of mounting features of a mounting block of the fiber management assembly shown in FIGS. 11A and 11B.

FIG. 12 shows a detail view of mounting features of mounting block 511 of fiber management assembly 501 shown in FIGS. 11A and 11B. Pocket 513b is formed in spherical surface 512 for accepting fiber coil 420b. At the bottom of pocket 513b is a floor 515b from which raised mounting surface 517b protrudes for mounting hub 421b while providing a gap between fiber coil 420b and floor 515b of pocket 513b. Mounting surface 517b includes fastening features 519b for mounting hub 421b, such as threaded holes. Corresponding features are present for accepting fiber coils 420a and 420c, respectively. Mounting block 511 also includes IOC housing mounting features 591, such as a platform, for mounting housing 430a for IOC 432a. Alternatively, IOC 432a, may be attached directly to mounting block 511, for example by an adhesive material.

Figure 13:
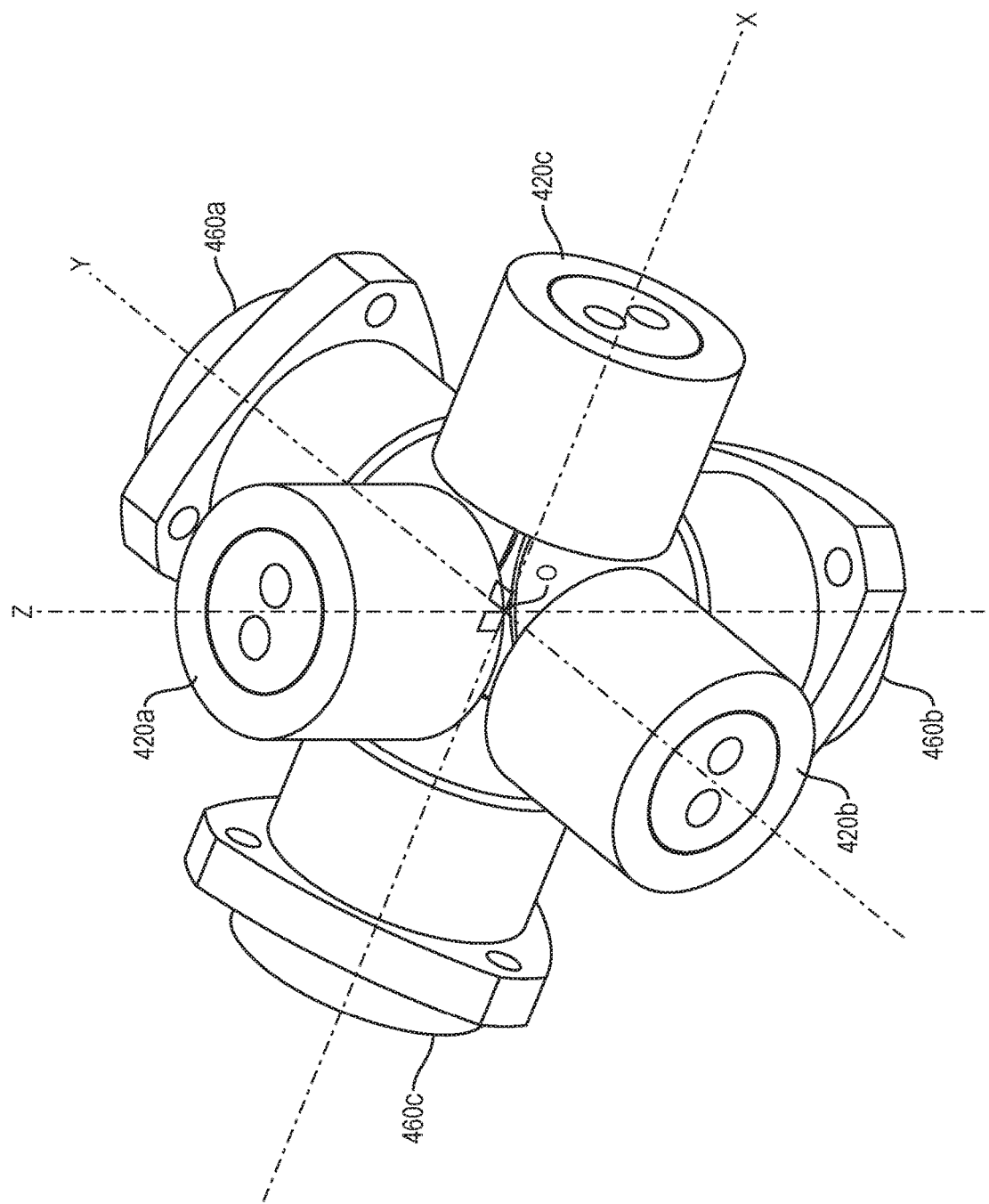
FIG. 13 is a perspective illustration of the three-axis FOG of FIGS. 11A-11B without the exterior surface of the spherical housing, illustrating the orientation of the fiber coils and accelerometers along Cartesian axes.

FIG. 13 is a perspective view illustration of the fiber-optic gyroscope 501 illustrated in FIGS. 11A-11B, but without the spherical surface 512, housing 430a, or IOC 432a. FIG. 13 illustrates how the fiber coils 420a-c and accelerometers 460a-c are oriented along Cartesian axes that are perpendicular to each other. In particular, the fiber coil 420c is oriented along the X axis, with the fiber coils 420a and 420b oriented along the Z and negative Y axes, respectively. Similarly, the accelerometers 460a-c are oriented with input axes along the Y, negative Z, and negative X axes, respectively.

As used herein, an "input axis" of a fiber coil is an axis perpendicular to the outer plane of the fiber coil or the plane in which the fiber coil is oriented and intersects a geometric center of the fiber coil. For example, the outer plane of the fiber coil 420c is oriented parallel to the YZ plane, while the input axis of the fiber coil 420c is the X axis. Similarly, an "input axis" of an accelerometer, as used herein, is the axis that is perpendicular to an outer face of the accelerometer and intersects a geometric center of the accelerometer. For example, the outer face of the accelerometer 460a is oriented in a plane perpendicular to the XZ plane, while the input axis of the accelerometer 460a is the Y axis, which is perpendicular to the XZ plane.

In the embodiment illustrated in FIGS. 11A-11B and 13, the input axes of the fiber coils, namely the X, Y, and Z axes for the coils 420c, 420d, and 420a, respectively, intersect at a common intersection point, which is the origin O of the XYZ coordinate system illustrated in FIG. 13. Similarly, the input axes X, Y, and Z of the accelerometers 460c, 460a, and 460b, respectively, also intersect at the origin of the XYZ Cartesian coordinate system, which is a common intersection point. In embodiments that include more than three fiber coils, such as the embodiment illustrated in FIGS. 3A-3B, input axes of fiber coils and accelerometers may similarly share a common intersection point, even if the input axes do not correspond to X, Y, and Z axes of a Cartesian coordinate system.

In other embodiments, the input axes of the accelerometers and fiber coils do not exactly intersect at a common intersection point, such as the origin of the XYZ coordinate system illustrated in FIG. 13. In certain embodiments, the input axes substantially intersect, and in yet other embodiments, the input axes do not intersect at all. In one example, the accelerometer the fiber coil 420c may be oriented such that the input axis of the fiber coil 420c intersects with either the Y axis or Z axis, but not both. In yet other embodiments, the input axis of the fiber coil 420c may not intersect with either the Y axis or Z axis shown in FIG. 13.

Although the embodiments shown in the figures include quantities of three or four YBDPMs formed in one IOC and an equal quantity of fiber coils, other embodiments within the scope of the claims and this disclosure can include any quantity of two or more YBDPMs formed in one IOC and an equal quantity of fiber coils aligned in substantially different directions in three-dimensional space (e.g., at least 45 degrees between the fiber coil axes). In addition, embodiments may alternatively include any quantity of two or more YBDPMs each formed in individual IOCs that are co-packaged into a common housing. Furthermore, although the embodiments shown in the figures include fiber coils arranged along Cartesian axes or in a regular tetrahedral pattern, the embodiments may alternatively include fiber coils arranged in other geometric patterns.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A fiber management assembly for a multi-axis fiber optic gyroscope (FOG), the assembly comprising:
   a mounting block comprising:
      an integrated optical circuit (IOC) mounting feature configured to permit mounting thereon an IOC;
      coil mounting features configured to permit mounting at least two optical fiber coils at the mounting block with the at least two fiber coils aligned in substantially different directions in three-dimensional space; and
      an exterior surface comprising at least one substantially exterior, curved zone onto which connecting segments of respective optical fibers between the IOC and respective coils of the at least two optical fiber coils are routed and affixed.

2. The fiber management assembly of claim 1, wherein the exterior surface has a substantially polyhedral shape.

3. The fiber management assembly of claim 2, wherein the exterior surface has a substantially rectangular block shape.

4. The fiber management assembly of claim 2, wherein the exterior surface has a substantially cubical shape.

5. The fiber management assembly of claim 2, wherein the exterior surface has a substantially tetradecahedral shape.

6. The fiber management assembly of claim 1, wherein the substantially exterior, curved zone includes a filleted edge of the exterior surface.

7. The fiber management assembly of claim 1, wherein the exterior surface has a substantially spherical shape.

8. The fiber management assembly of claim 7, wherein the substantially exterior, curved zone includes a portion of the substantially spherical shape.

9. The fiber management assembly of claim 1, wherein the substantially exterior, curved zone includes a groove or channel in the exterior surface.

10. The fiber management assembly of claim 1, wherein the IOC mounting feature is a flat side of the exterior surface of the mounting block, the flat side being configured to receive the IOC or a housing of the IOC.

11. The fiber management assembly of claim 1, wherein the coil mounting features are further configured to permit mounting of the at least two optical fiber coils with respective input axes that share a common intersection point.

12. The fiber management assembly of claim 1, wherein the coil mounting features are further configured to permit mounting of the at least two optical fiber coils with respective input axes that are perpendicular to each other.

13. The fiber management assembly of claim 1, wherein the coil mounting features are further configured to permit mounting of at least three optical fiber coils.

14. The fiber management assembly of claim 1, wherein the coil mounting features are further configured to permit mounting of at least four optical fiber coils.

15. The fiber management assembly of claim 14, wherein the coil mounting features are further configured to permit mounting of four optical fiber coils with four respective input axes that intersect respective vertices of a tetrahedron.

16. The fiber management assembly of claim 1, wherein the IOC includes Y-branch dual phase modulators or other phase modulators configured to modulate optical phase of light in the at least two optical fiber coils.

17. The fiber management assembly of claim 1, wherein the exterior surface includes means for securing the mounting block to a host surface.

18. The fiber management assembly of claim 1, wherein the mounting block is monolithic.

19. The fiber management assembly of claim 1, wherein the mounting block comprises a plurality of pieces that fit together to form the exterior surface.

20. An inertial measurement unit (IMU) comprising:
a fiber optic gyroscope (FOG) including the fiber management assembly of claim 1; and
at least one accelerometer,
wherein the IMU is configurable to output angular velocities for respective input axes of respective fiber coils based on information from the FOG and to output at least one acceleration based on information from the accelerometer.

21. A fiber management assembly for a multi-axis fiber optic gyroscope (FOG), the assembly comprising:
a mounting block comprising:
an integrated optical circuit (IOC) mounting feature configured to permit mounting thereon an IOC;
coil mounting features configured to permit mounting at least two optical fiber coils at the mounting block with the at least two fiber coils aligned in substantially different directions in three-dimensional space; and
a substantially spherical exterior surface onto which connecting segments of respective optical fibers between the IOC and respective coils of the at least two optical fiber coils are routed and affixed.

* * * * *